(12) United States Patent
Al-Laban

(10) Patent No.: US 12,144,702 B2
(45) Date of Patent: Nov. 19, 2024

(54) METHOD OF PRODUCING AN ORTHODONTIC TRANSPALATAL ARCH HAVING MULTIPROPERTIES

(71) Applicant: Yasir Ruda Abdul-Hussain Al-Laban, Baghdad (IQ)

(72) Inventor: Yasir Ruda Abdul-Hussain Al-Laban, Baghdad (IQ)

( * ) Notice: Subject to any disclaimer, the term of this patent is extended or adjusted under 35 U.S.C. 154(b) by 498 days.

(21) Appl. No.: 17/120,435

(22) Filed: Dec. 14, 2020

(65) Prior Publication Data
US 2022/0183793 A1    Jun. 16, 2022

(51) Int. Cl.
*A61C 7/02* (2006.01)
*B29C 39/10* (2006.01)
*B29C 39/38* (2006.01)
*B29L 31/00* (2006.01)

(52) U.S. Cl.
CPC ............. *A61C 7/02* (2013.01); *B29C 39/10* (2013.01); *B29C 39/38* (2013.01); *B29L 2031/753* (2013.01)

(58) Field of Classification Search
CPC ............... A61C 7/02; A61C 7/20; A61C 7/10
See application file for complete search history.

(56) References Cited

U.S. PATENT DOCUMENTS

| | | | | |
|---|---|---|---|---|
| 4,197,644 A * | 4/1980 | Ackerman, Jr. | ......... | A61C 7/10 433/7 |
| 4,239,487 A * | 12/1980 | Murdock | ................. | A61C 7/10 433/7 |
| 4,869,666 A * | 9/1989 | Talass | ....................... | A61C 7/20 433/20 |
| 4,892,478 A * | 1/1990 | Tateosian | .................. | A61C 7/10 264/16 |
| 5,063,082 A * | 11/1991 | Adell | ........................ | A61C 7/20 106/35 |
| 5,454,716 A * | 10/1995 | Banerjee | ................... | A61C 7/20 433/20 |
| 6,536,439 B1 * | 3/2003 | Palmisano | .............. | A61F 5/566 128/848 |
| 7,717,707 B2 * | 5/2010 | Cope | ........................ | A61C 7/10 433/7 |

(Continued)

*Primary Examiner* — Andrew D Graham
(74) *Attorney, Agent, or Firm* — Preston Smirman; SMIRMAN IP LAW, PLLC

(57) ABSTRACT

The present invention discloses a method of producing an orthodontic transpalatal arch having multiproperties. The present invention provides the transpalatal arch which is easy to prepare without the need of laboratory, cast, and impression. It includes the steps of (a) taking a sterile electrical wire (01) wherein the electrical wire (01) is pushed to follow the palatal contour, opposite to the area of the upper first right and left side molars with the help of a band pusher to record all texture and contour of the palatal area from upper left first molar to upper right first molar, (b) arranging a twistflex (02) inside a plastic tube (04) piece, (c) fixing the plastic tube (04) with twistflex (02) to the wire in a similar shape of the wire recorded for the palatal area by a plurality of hair clamps (05), (d) pouring a resin material inside the plastic tube (04) based on the required properties of the transpalatal arch, (e) setting the resin material along with the twistflex (02), and (f) cutting the plastic tube (04) to release the set resin material with the twistflex (02).

4 Claims, 8 Drawing Sheets

(56) References Cited

U.S. PATENT DOCUMENTS

| | | | | |
|---|---|---|---|---|
| 9,011,145 B2* | 4/2015 | Hang | A61C 7/36 | 433/7 |
| 9,017,070 B2* | 4/2015 | Parker | A61C 7/20 | 433/7 |
| 9,204,991 B1* | 12/2015 | Harkins | A61F 5/566 | |
| 10,595,971 B2* | 3/2020 | Parker | A61C 7/282 | |
| 2002/0192617 A1* | 12/2002 | Phan | A61C 19/003 | 433/18 |
| 2003/0049581 A1* | 3/2003 | DeLuke | A61C 7/10 | 433/7 |
| 2003/0124480 A1* | 7/2003 | Peacock, III | A61C 7/18 | 433/23 |
| 2007/0031774 A1* | 2/2007 | Cinader, Jr. | A61C 7/00 | 433/213 |
| 2009/0311646 A1* | 12/2009 | Winsauer | A61C 7/10 | 433/7 |
| 2011/0143300 A1* | 6/2011 | Villaalba | A61C 7/10 | 433/7 |
| 2011/0308532 A1* | 12/2011 | Nelissen | A61F 5/566 | 128/848 |
| 2013/0323664 A1* | 12/2013 | Parker | A61C 7/20 | 433/7 |
| 2014/0080082 A1* | 3/2014 | Lowe | A61C 19/003 | 433/6 |
| 2014/0170585 A1* | 6/2014 | Parker | A61C 7/22 | 433/7 |
| 2014/0363778 A1* | 12/2014 | Parker | A61C 8/0096 | 433/18 |
| 2016/0184067 A1* | 6/2016 | Parker | A61C 7/22 | 433/18 |
| 2016/0296303 A1* | 10/2016 | Parker | A61N 1/0548 | |
| 2019/0159871 A1* | 5/2019 | Chan | A61C 5/62 | |

* cited by examiner

METHOD OF PRODUCING AN ORTHODONTIC TRANSPALATAL ARCH HAVING MULTIPROPERTIES

FIELD OF THE INVENTION

The present invention relates to a method of producing an orthodontic transpalatal arch having multiproperties and more particular to prepare the transpalatal arch which is easy to prepare without the need of laboratory, cast, and impression.

BACKGROUND OF THE INVENTION

The transpalatal arch TPA is used in fixed orthodontic treatment and is essential in anchorage reinforcement particularly in the cases of critical anchorage like in bimaxillary proclination or in canine impaction. In such cases of fixed orthodontic treatment, there is a need of the anchorage reinforcement. One of the anchorage reinforcement methods is the use of the TPA.

The conventional way for the preparation of the transpalatal arch is a complicated process which includes the steps as: (a) placement of an elastic separator (by the help of an elastic separator pliers), mesial and distal to tooth and an orthodontic band is put on it, usually on the upper first permanent molar in right and left side, (b) elastic separator is removed after 24 hours of placement and the proper size of the bands are inserted in right and left molars, (c) then an alginate impression for upper jaw was taken, just after placement of the band, (d) after the bands are transferred from patient mouth to the alginate impression, and (e) the impression gets ready for pouring with stone in order to get dental cast with the bands. At this stage the lab work is required for the fabrication of the TPA by wire bending of hard stainless steel wire gauge 1 mm and soldering procedure, finishing, polishing and delivering to orthodontist for placement in the patient mouth.

This conventional method is a lengthy process, requires laboratory and is costly. Moreover, it requires impression, cast and materials for cementation like glass ionomer cement. Further, the bands in general have several harmful effects on the teeth and/or the patient including pain, caries and periodontal problems[1-4].

Thus, there is a need for an improved method to prepare the transpalatal arch which is easy to prepare without the need of laboratory, cast, and impression.

OBJECTIVES OF THE INVENTION

The prime objective of the present invention is to provide a method of producing an orthodontic transpalatal arch having multiproperties.

Another objective of the present invention is to provide a method to prepare the transpalatal arch which is easy to prepare without the need of laboratory, cast, and impression.

Another objective of the present invention is to provide a TPA without bands.

Yet another objective of the present invention is to provide a TPA which can be removed anytime without interfere with arch wire in the fixed appliance.

Yet another objective of the present invention is to provide a method which saves time and effort.

Yet another objective of the present invention is to provide a method to prepare the TPA which can be used by an orthodontist by his own.

Yet another objective of the present invention is to provide the TPA which is comfortable for the patients during use.

Yet another objective of the present invention is to provide the TPA which is aesthetic for the patient.

These and other objectives of the present invention will be apparent from the drawings and descriptions herein. Every objective of the invention is attained by at least one embodiment of the present invention.

BRIEF DESCRIPTION OF THE ACCOMPANYING DRAWINGS

The drawings described herein are for illustrative purposes only of selected embodiments and not all possible implementations, and are not intended to limit the scope of the present disclosure. The present invention will be described in more detail hereinafter with the aid of the description which relates to preferred embodiments of the invention explained with reference to the accompanying schematic drawings, in which.

DETAILED DESCRIPTION OF THE INVENTION

The following description includes the preferred best mode of one embodiment of the present invention. It will be clear from this description of the invention that the invention is not limited to these illustrated embodiments but that the invention also includes a variety of modifications and embodiments thereto. Therefore, the present description should be seen as illustrative and not limiting. While the invention is susceptible to various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

As used herein, the singular forms "a", "an" and "the" designate both the singular and the plural, unless expressly stated to designate the singular only.

Figure 1:
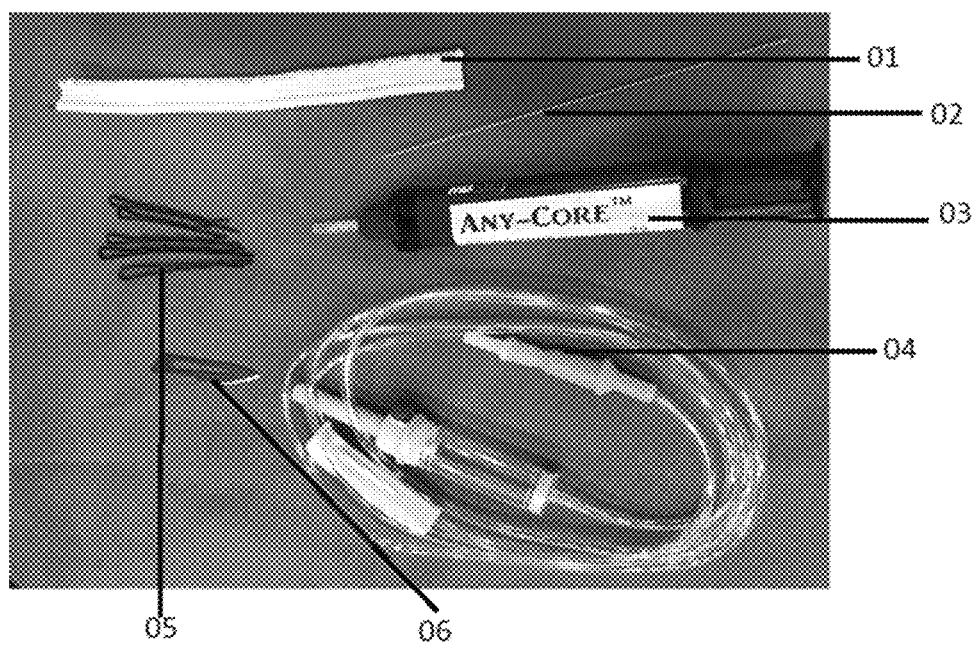
FIG. 1 represents all materials required for a method of producing an orthodontic transpalatal arch having multiproperties according to the present invention.

In reference of FIG. 1, the present invention relates to a method of producing an orthodontic transpalatal arch having multiproperties. It includes the steps of:

taking a sterile electrical wire (01) wherein the electrical wire (01) is pushed to follow the palatal contour, opposite to the area of the upper first right and left side molars with the help of a band pusher to record all texture and contour of the palatal area from upper left first molar to upper right first molar, arranging a twistflex (02) inside a plastic tube (04) piece, fixing the plastic tube (04) with twistflex (02) to the wire in a similar shape of the wire recorded for the palatal area by a plurality of hair clamps (05), pouring a resin material inside the plastic tube (04) based on the required properties of the transpalatal arch, setting the resin material along with the twistflex (02), and cutting the plastic tube (04) to release the set resin material with the twistflex (02).

Figure 2:
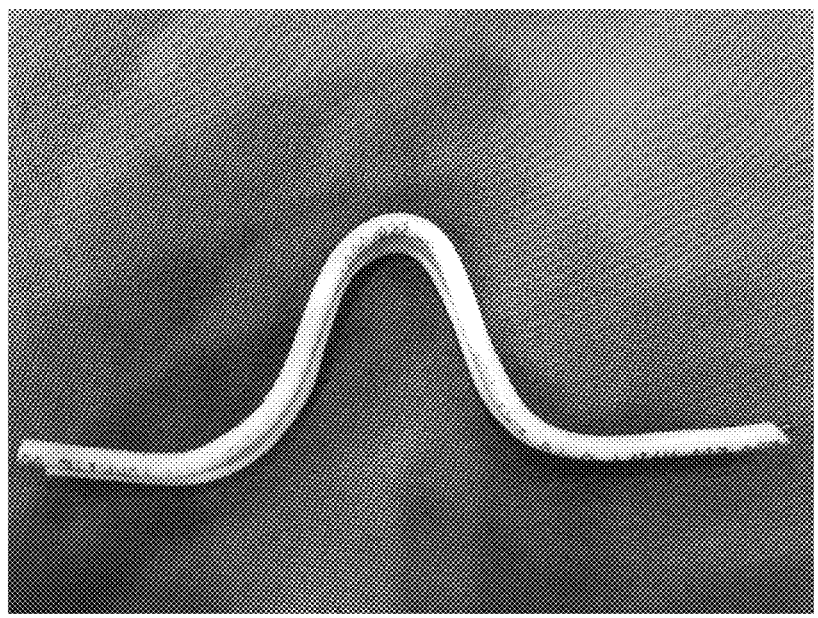
FIG. 2 represents an electrical wire (01) which has been pushed to follow the palatal contour of the patient's mouth, opposite to the area of the upper first right and left side molars with the help of a band pusher to record all texture and contour of the palatal area from upper left first molar to upper right first molar.

In a preferable example, the size of the sterile electrical wire (01) is 2*1.5 (semeins Co, Germany) and length of the wire is about 12 cm as shown in FIG. 2. FIG. 2 represents an electrical wire (01) which has been pushed to follow the palatal contour of the patient's mouth, opposite to the area of the upper first right and left side molars with the help of a band pusher to record all texture and contour of the palatal area from upper left first molar to upper right first molar.

Figure 3:
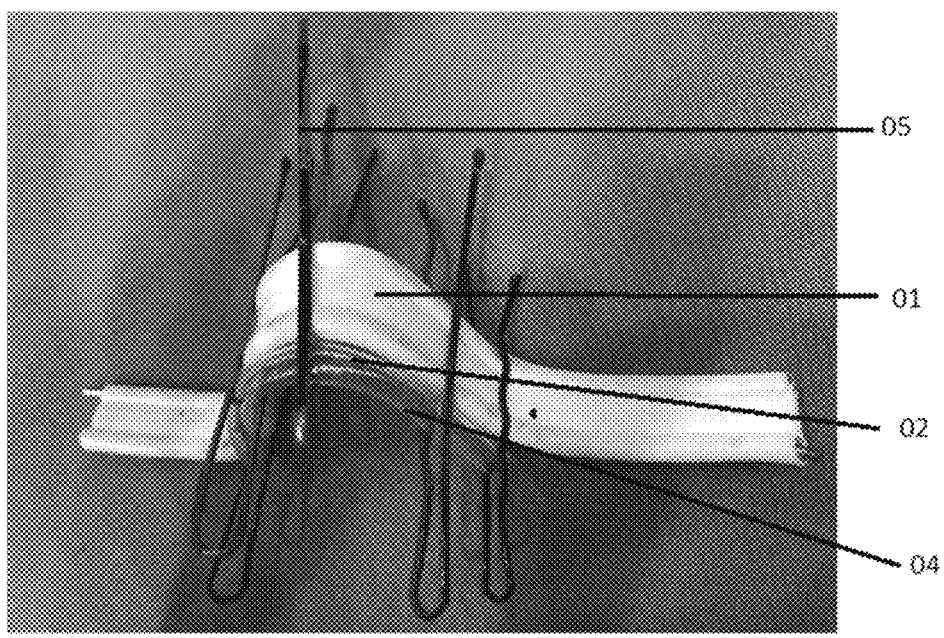
FIG. 3 represents the plastic tube (04) which is fixed to the electrical wire (01) by the hair clamps (05). An orthodontic braided wire of steel (twistflex (02)), was inserted inside the plastic tube (04) as reinforcement for the TPA.

FIG. 3 represents the plastic tube (04) which is fixed to the electrical wire (01) by the hair clamps (05). The plastic tube (04) used is for example is an intravenous giving device (I.V. giving fluid device), preferably the length is about 12 cm. The plastic tube (04) is used to adhere or fix to the wire by using the hair clamps (05) (hair grips or bobby pins). The plastic tube (04) is fixed to the wire as such that it follows all the curvature of the wire. Therefore, the tube acts as a mold for the later step of preparing the TPA.

Figure 4:
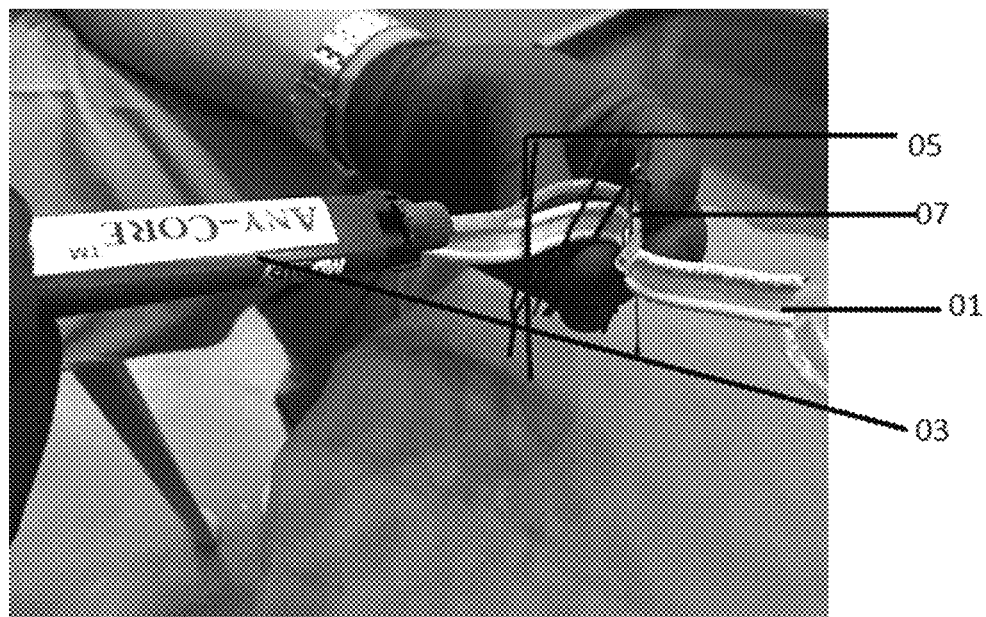
FIG. 4 represents a step of the method in which the plastic tube (04) is filled with the resin cement through a tube of the resin cement, orthodontic braided wire of steel (twistflex (02)), was inserted inside the plastic tube (04) as reinforcement for the TPA.

FIG. 4 represents a step of the method in which the plastic tube (04) is filled with the resin cement through a tube of the resin cement, orthodontic braided wire of steel (twistflex (02)), was inserted inside the plastic tube (04) as reinforcement for the TPA according to the required properties of the TPA.

The properties of the TPA in the present invention depend on the properties of the resin which is injected inside the tube, so the material engineering plays a role in determination of the properties of the TPA. For example one of the suitable materials is fibre reinforced composite to provide more rigid TPA. Additionally, hard stain less steel and/or orthodontic braided wire of steel—twistflex (02) gauge preferably of 0.032 inch may be added inside the tube to increase the rigidity. In other case, addition of plasticizer to fiber reinforced resin is used for maxillary expansion to provide flexible TPA. In other case normal light cure of resin is done or duel cure resin cement arranged inside the tube in addition to one or two of braided wire of steel—twistflex (02).

Figure 5:
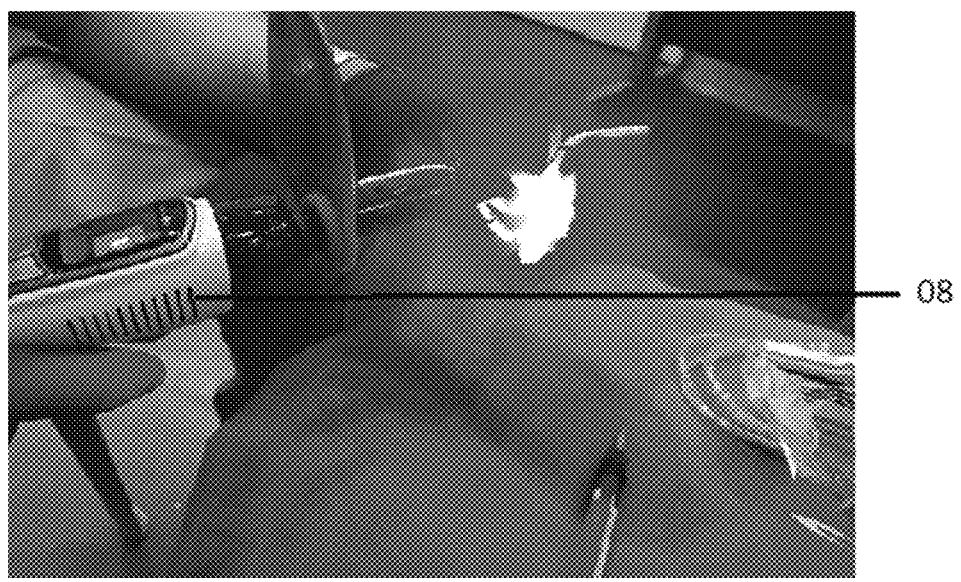
FIG. 5 represents a step to set the resin by curing light providing through a light cure device (08). The light passes through the transparent material of the tube to the resin inside, while the plastic tube (04) has been holded through the hair clamps (05) or bobby pins with the electrical wire.

Now, the resin material or other material is set inside the plastic tube (04) through a light cure device (08), usually the resin is light or duel cure. FIG. 5 represents a step to set the resin by curing light providing through a light cure device (08). The light passes through the transparent material of the tube to the resin inside, while the plastic tube (04) has been holded through the hair clamps (05) or bobby pins with the electrical wire. There is no need of light cure in case of the chemical cure of the resin.

Figure 6:
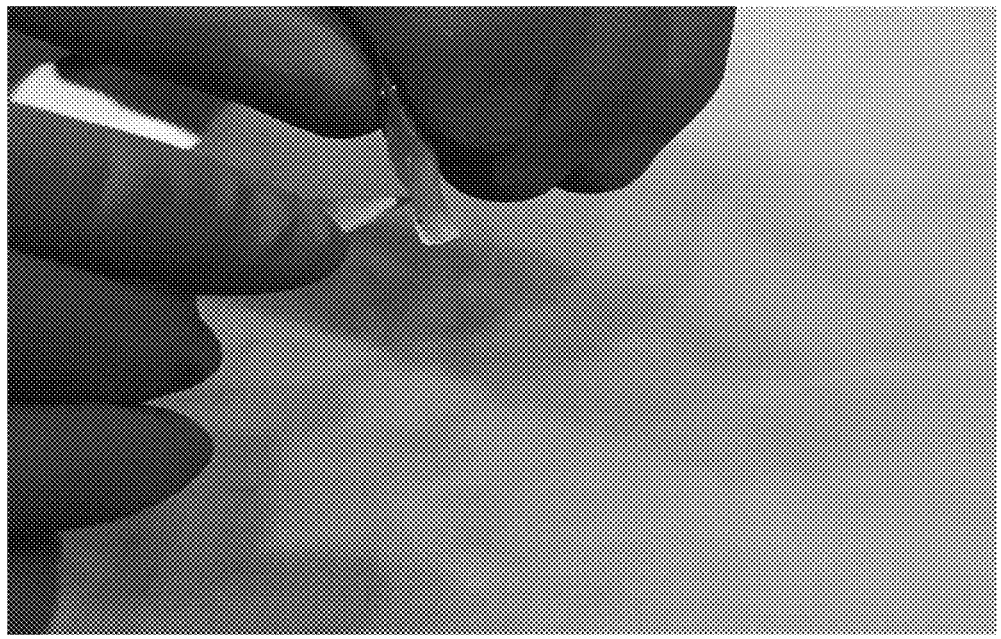
FIG. 6 represents a step of cutting the plastic tube (04) to separate the plastic tube (04) from the rigid and set resin cement through a surgical blade (06).

FIG. 6 represents a step of cutting the plastic tube (04) to separate the plastic tube (04) from the rigid and set resin cement through a surgical blade (06). The longitudinal cut has been done in plastic tube (04) to release the set resin from inside the tube which provides the TPA.

Figure 7:
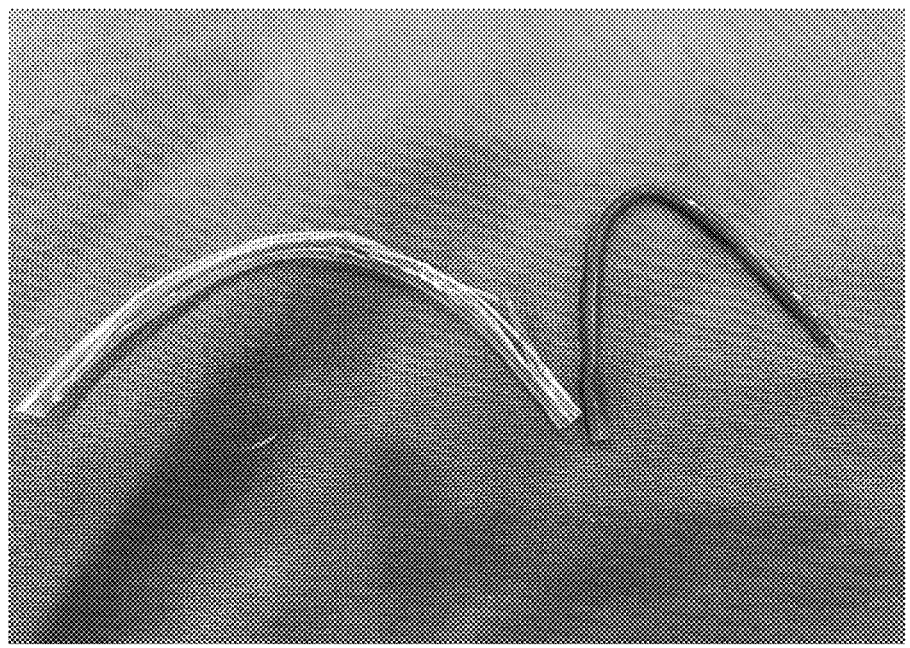
FIG. 7 represents the plastic cut as shown in FIG. 6 at left side and a TPA produced through the present method which is ready for cementation. The set resin core once peeled acts as the TPA, which contains all the curvature details of the palatal area and is ready for cementation inside patient mouth.

FIG. 7 represents the plastic cut as shown in FIG. 6 at left side and a TPA produced through the present method which is ready for cementation. The set resin core once peeled acts as the TPA that contains all the curvature details of the palatal area, and is ready for cementation inside patient mouth.

Figure 8:
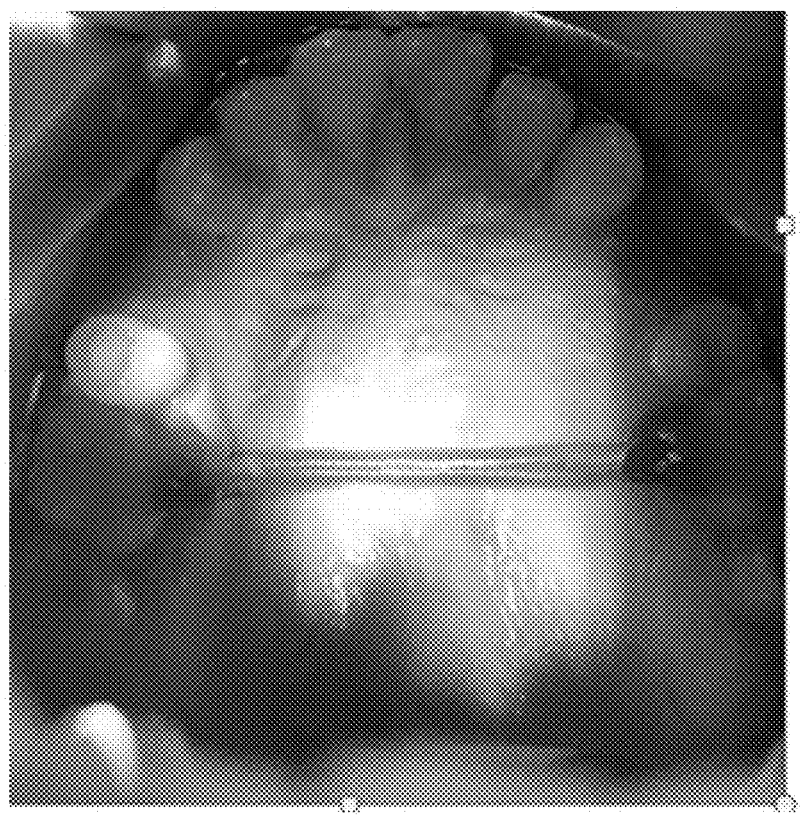
FIG. 8 represents the TPA after cementation, finishing and polishing inside the patient's mouth.

TPA inside the patient mouth is fixed by the help of acid etch technique. FIG. 8 represents the TPA after cementation, finishing and polishing inside the patient's mouth TPA prepared according to the present invention is without bands and thus it can easily remove any time without interfering with arch wire in the fixed appliance. This saves time and effort. Further, it solves the problem which occurs through the conventional TPA with bands such as periodontal problem and bacteremia, patient discomfort, white spot lesions that might develop underneath the bands and residual space after band removal.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the spirit or scope of the present invention as defined.

REFERENCE

1—Masato Fujisawa, Akira Komri, A modified transpalatel arch with customized bonding base, Orthodontic waves 2011; (70):39-42.
2—Luca Pizzoni, Fiber reinforced composite transpalatal arch in impacted canine orthodontic treatment, progress in orthodontics 2010; 11:83-85.
3—Adriano Giacomo C, Thomas B, Hans P, Bantleon, Gerhard K. An innovative adhesive procedure for connecting transpalatal arches with palatal implant, European J of orthodontics 2005; (27):226-230
4—Toshitsugu K, Takuya N, So K, Toshio I. Application of direct bonding lingual arch. Iwata T-J Pediatr Dent 2015; 3, (3):97-100.

I claim:

1. A method of producing an orthodontic transpalatal arch, comprising the steps of:

taking a sterile electrical wire, wherein the electrical wire is covered in a plastic cladding and is pushed to follow a palatal contour, opposite to the area of an upper first right and left side molars with the help of a band pusher to record all textures and contours of a palatal area from the upper first left molar to the upper first right molar;

arranging a flexible orthodontic wire inside a plastic tube;

fixing the plastic tube with the flexible orthodontic wire to the electrical wire in a similar shape of the electrical wire recorded for the palatal area by a plurality of selectively removable fixing members;

pouring a resin material inside the plastic tube based on the required properties of the orthodontic transpalatal arch;

setting the resin material along with the flexible orthodontic wire; and cutting the plastic tube to release the set resin material with the flexible orthodontic wire.

2. The method as claimed in claim 1, wherein hard stainless steel or orthodontic braided steel wire is added inside the plastic tube, before arranging the flexible orthodontic wire inside the plastic tube, to increase the rigidity thereof.

3. The method as claimed in claim 1, wherein the resin is reinforced with fiber and plasticizer for maxillary expansion to provide a more flexible transpalatal arch.

4. The method as claimed in claim 1, wherein a dual cure resin cement is arranged inside the plastic tube in addition to one or more braided steel wires, before arranging the flexible orthodontic wire inside the plastic tube.

* * * * *